Feb. 28, 1950 W. A. HYLAND ET AL 2,498,888
WINGED CULTIVATOR
Original Filed Sept. 10, 1943 3 Sheets-Sheet 2

INVENTORS
WILLIAM A. HYLAND
ERNST E. SCHNELL
BY
ATTORNEYS

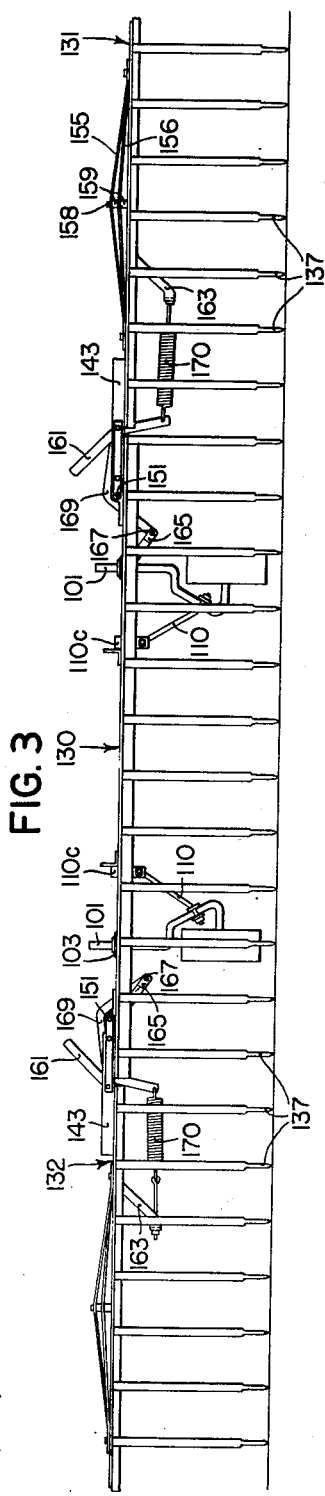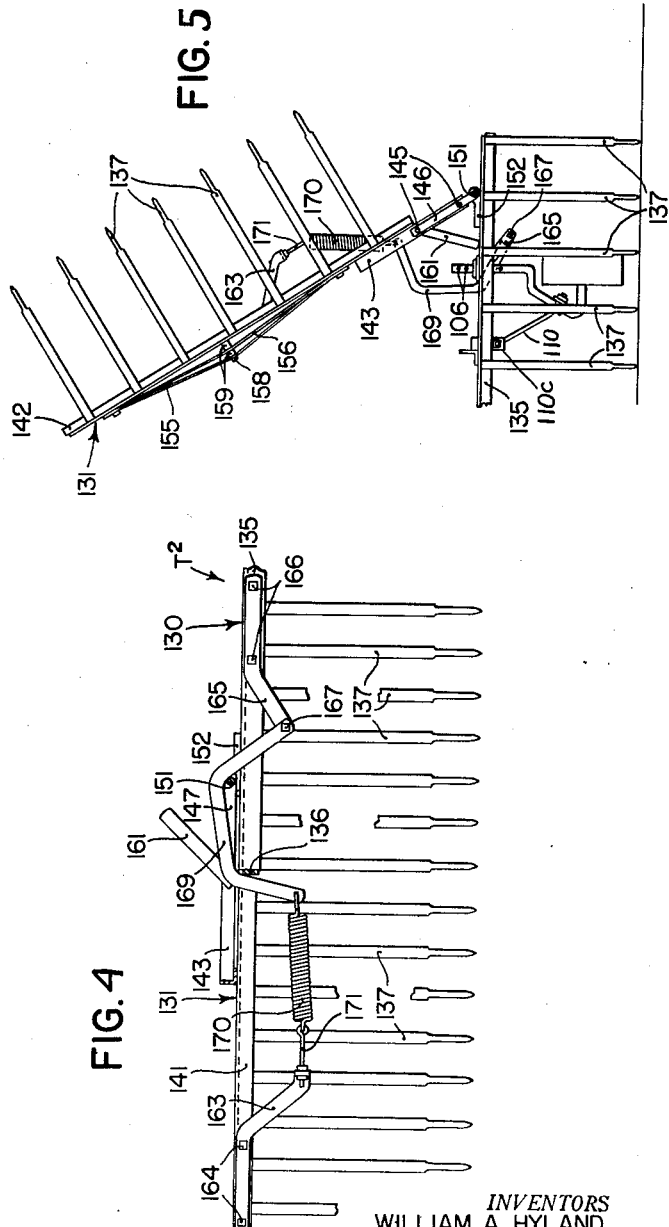

Patented Feb. 28, 1950

2,498,888

UNITED STATES PATENT OFFICE 2,498,888

WINGED CULTIVATOR

William A. Hyland and Ernst E. Schnell, Horicon, Wis., assignors to John Deere Van Brunt Company, a corporation of Wisconsin Original application September 10, 1943, Serial No. 501,882. Divided and this application September 28, 1944, Serial No. 556,220

9 Claims. (Cl. 55—93)

1

This application is a division of our application, Serial No. 501,882, filed September 10, 1943, now Patent No. 2,429,552, dated October 21, 1947.

The present invention relates generally to agricultural machines and more particularly to cultivating machines of the type that is adapted to be mounted directly on a propelling tractor.

The object and general nature of the present invention is the provision of a weeder comprising hingedly connected sections with suitable biasing means serving not only to hold the sections in operating position but also to hold them in an inoperative or transport position, thereby simplifying the construction and enabling the outfit to pass through narrow gates and other restricted areas.

Another feature of the present invention is the provision of improved lifting connections mounted on the frame and connected with the tractor whereby, when first lifting the tools, there is a relatively high ratio of movement of the lifting lever to the corresponding movement of the tool frame, which ratio is materially reduced after the tools have been lifted clear of the ground, at which time the load becomes relatively light. Another feature of this invention is the provision of improved power connections arranged whereby movement of an adjusting member on the implement frame may be utilized for adjusting the depth of operation of the implement. It is also a feature of this invention to provide new and improved frame and hitch means, with appropriate connections, whereby the cultivator may be mounted on an implement frame to be propelled by the tractor.

It is also a feature of this invention to provide an implement for use with a tractor having a power lift, the implement having a hand lever and suitable connections which are adapted to be connected with the tractor power lift, whereby the latter may be utilized for raising or lowering the implement while the adjusting member on the implement itself is utilized for adjusting the depth of operation.

These and other objects and advantages of the present invention will be apparent to those skilled in the art after a consideration of the following detailed description, taken in conjunction with the accompanying drawings.

2

Figure 1:
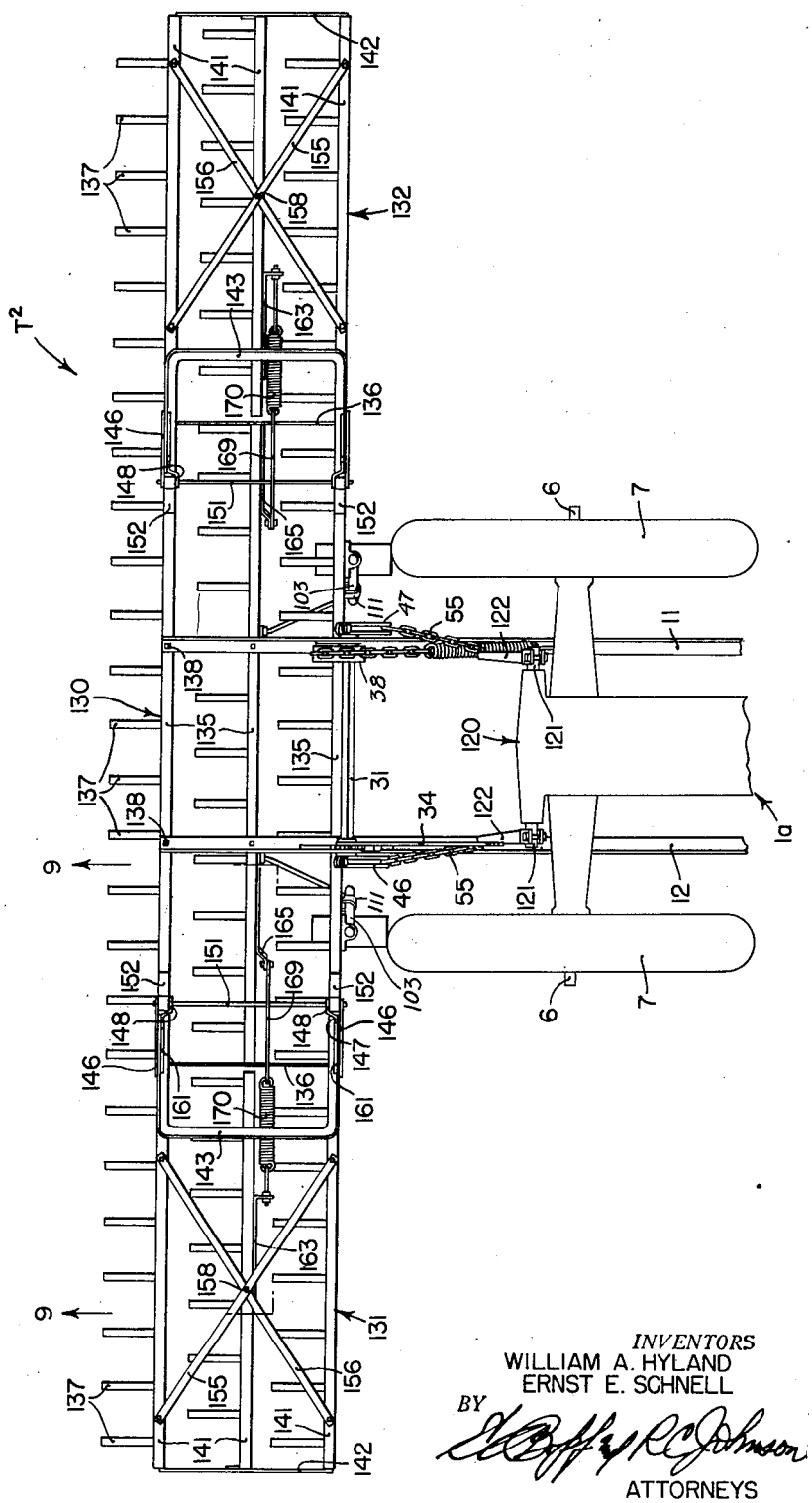
Fig. 1 is a plan view of an integral or tractor mounted weeder in which the principles of the present invention have been incorporated.

Figure 3 is a rear view of the weeder shown in Figure 1, with the outer sections in extended position.

Figure 4 is an enlarged fragmentary sectional view taken along the line 9—9 of Figure 1.

Figure 5 is a fragmentary rear view showing the raised position of an end section.

Figure 2:
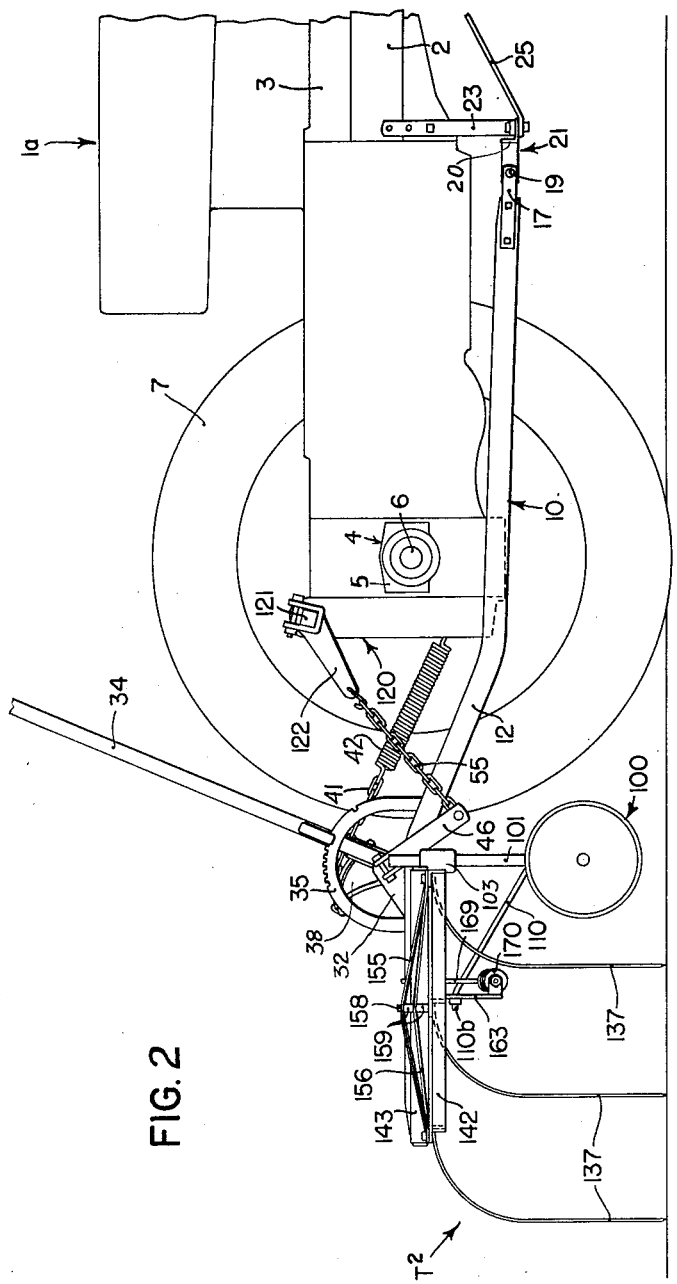
Figure 2 is an end view of the weeder shown in Figure 1.

Referring now more particularly to Figures 1 and 2, the tractor is indicated in its entirety by the reference numeral 1a and is of conventional construction, including front steering wheels (not shown), frame means 2, a tractor motor 3 and a rear axle 4 which includes laterally outwardly directed quill sections 5 in which axle shafts 6 are journaled for rotation. Rear traction wheels 7 are fixed to the axle shafts 6.

An implement frame is indicated in its entirety by the reference numeral 10 and includes a pair of generally longitudinally extending laterally spaced frame bars 11 and 12 connected together at their front ends by a pair of cross braces which are bolted or otherwise secured at their ends to the horizontal flanges of the angles forming the frame bars 11 and 12, as is shown in more detail in the above-identified parent application. Secured to the forward end of each of the frame bars 11 and 12, as best shown in Figure 2, is a pair of connecting straps 17 which are provided with a plurality of openings to receive bolt means by which the connecting straps are secured to the frame bars in different positions. The front ends of the straps of each pair are apertured to receive a connecting pin 19. The other frame bar is also provided with a similar pair of connecting straps apertured to receive a connecting pin, and as best shown in Figure 2, the connecting pins 19 serve to pivotally connect the implement frame 10 with an attaching strap 21 which is bolted to a draw angle 20 connected by hanger elements 23 to the frame 2 of the tractor. Also, hitch members 25 are connected at their rear ends to the end portions of the draw angle 20 and at their forward ends to the front portion of the tractor frame. The front braces, mentioned above, serve to maintain the frame bars 11 and 12 in laterally spaced relation and the rear ends of the frame bars 11 and 12 are maintained in laterally spaced relation by the tool unit T² that is attached thereto, as will be explained in detail later.

In order to lift the ground engaging tools into their transport position, we provide raising means that affords a relatively high ratio of movement of the operating means to the corresponding movement of the tool unit in a vertical direction but after the tools have been lifted up to and above the ground surface, the lifting connections are then adapted to provide a relatively rapid lift to raise the tools into their fully raised or transport position.

Referring now more particularly to Figure 1, a transverse rockshaft 31 is journaled in a pair of brackets 32 fixed, respectively, to the frame bars 11 and 12. A hand lever 34 is clamped to the rockshaft 31 and operates adjacent a sector 35 which is fixed to the right hand frame bar 12. At the other side of the tool frame the rockshaft 31 carries a cam member 38 clamped to the rockshaft adjacent the left hand bracket 32. The cam member is provided with a slot at its rear portion to receive one of the rear links of a chain 41 that at its other end is connected to a spring 42 that, in turn, is anchored to a lug on the forward portion of the frame bar 11. The cam 38 is so shaped that the spring exerts a substantially constant force tending to turn the rockshaft 31 in a clockwise direction (Figure 2).

The rockshaft 31 extends laterally outwardly beyond the bracket at each side of the frame 10, and secured to each end of the rockshaft 31 is a pair of arms 46 and 47. A chain 55 is connected at its lower end to each of the arms 46 and 47, and at its upper end, each chain is connected to a power lift rockshaft arm 122 at each side of the tractor. The arms 122 are fixed to a power lift rockshaft 121, and the rockshaft 121 and arms 122 form a part of a power lift unit which is indicated in its entirety by the reference numeral 120 and preferably forms a part of the tractor 1a. A power lift of this type is shown in the prior United States patent to E. McCormick et al., 2,107,760, dated February 8, 1938, to which reference may be had if necessary. It will be noted from Figure 2 that when the implement is in a lowered or operating position the chain 55 and the arm 122 at each side of the tractor are disposed more or less in a straight line relation. Hence, when the tractor power lift is actuated to raise the implement into a transport position, the first lifting movement takes place at a ratio of movement of power lift arm to corresponding movement of the implement frame in a vertical direction that is relatively high, thus preventing any tendency to overload the power lift unit of the tractor when raising the implement with the tools still in the ground. After the tools have been lifted clear of the ground, each chain 55 extends more or less at the right angle to the associated arm 122 and hence the lift is more rapid. This provides for a substantially uniform application of power.

The implement T² comprises an integral weeder adapted to be secured to the rear portions of the main frame angles 11 and 12. The implement T² includes three sections, a center section 130 and right and left end sections 131 and 132. The end sections 131 and 132 are substantially identical. The center section 130 comprises a plurality of transverse angles 135 which are connected together at their ends by end bars 136. A plurality of weeder teeth 137 are bolted to each of the bars 136, the teeth being arranged in staggered relation. The bars 135 are bolted directly to the rear portions of the main frame angles 11 and 12, as indicated at 138, the bolts 138 passing through the horizontal flanges of the weeder angles 135 and the lower horizontal flanges of the main frame angles 11 and 12. Each of the end weeder sections 131 and 132 is of similar construction, including a plurality of transverse angles 141 connected together at their outer ends by an end angle 142. At their inner ends the angles 141 are secured to a yoke 143 in the form of a U-shaped member made of an angle or other shape, the horizontal flange of the yoke 143 being bolted at a number of points to the inner end portions of the angles 141. The ends of the yoke are apertured to receive bolts 145 by which a strap member 146 is fixed to the outer side and a second strap member 147 having an offset end 148 is fixed to each end of the yoke 143. The pairs of straps 146, 147 are apertured to receive the ends of a hinge rod 151 that is supported by brackets 152 fixed to the front and rear weeder frame angles 141. The rod 151 thus forms the hinge connection between the center weeder section and the laterally outer section 131. The other outer section 132 is connected with the inner section 130 in substantially the same manner and hence further detailed description is believed to be unnecessary. It will be noted that the brackets 152 are, at each side of the center section 130, disposed laterally inwardly of the ends of the center section and that the yokes 143 abut against the ends of the weeder frame angles 141 when the three sections are extended. Each outer section is adapted to swing upwardly about the hinge rod 151 but is limited in its downward movement relative to the center section by the construction just described. Each of the laterally outer sections is reenforced by two pair of cross bars 155 and 156 which at their ends are bolted to the front and rear angles and at their center are connected by a stud 158 and bushings 159 with the central portion of the center angle.

According to the principles of the present invention, means is provided to serve the dual purpose of yieldingly holding the outer sections down in operating position or in their upper or transport position. As best shown in Figure 5, when each laterally outer weeder section is swung upwardly into a transport position, it is disposed substantially over the ends of the main frame bars 11 and 12, and to hold the hinged sections against further downward movement, each section is provided with a pair of struts or stop members 161 held in place by one of the bolts 145 and disposed so as to rest against the front and rear angles of the center section 130. Each laterally outer or hinged section is provided with a downwardly extending bracket 163 which is bolted to the adjacent part of the center weeder frame angle, as indicated at 164. A similar bracket 165 is bolted, as at 166, to the intermediate frame angle of the center section 130. The bracket 165 carries a pivot bolt 167 by which a generally U-shaped connecting link or yoke 169 is pivoted, at one end. At the other end the connecting link 169 receives the inner end of a biasing tension spring 170, the outer end of which is connected by an adjusting bolt 171 to the lower end of the bracket 163. As best shown in Figure 4, the connecting link 169 is formed so as to clear the pivot rod 151 while accommodating the disposition of the biasing spring 170 in a line that extends from the bracket 163 to the bracket 165 below the pivot rod 151. The tension in the spring 170 is adjusted so as to exert the desired pressure tending to hold the outer weeder section to its work, yet when the outer section is swung upwardly into its transport position the tension of the spring 170 is exerted in a line that passes to the left of the rod 151, thereby acting to hold the raised section in its transport position. Thus, the single spring connection serves the dual purpose of holding the laterally outer section down to its work and also, when raised to its transport position, in that position. The other hinged section is connected by spring means with the center section through substantially the same means and hence the same reference numerals have been employed. However, it is to be noted that in order to permit the use of identical brackets, the brackets 163 and 165 are bolted to the weeder sections in slightly different locations, thus rendering it unnecessary to provide right and left hand brackets.

The gauge wheel construction used with the integral weeder, described above, may be quite similar to that used with the field cultivator shown in the above-identified parent application. Each gauge wheel 100 is mounted for rotation on the lower end of a gauge wheel shank 101, the upper end of which is received for vertical adjustment in a bracket 103 fixed in any suitable way to the front frame angle 135. A pin or bolt carried by the bracket 103 is adapted to be disposed in one or the other of a plurality of openings 106 (see Figure 5) formed in the rear side of the gauge wheel shank 101 at the upper end thereof. Each shank 101 is held against displacement by a brace rod 110 which is secured at is front end to the shank 101 by a clamp 111 or the like and at its rearward end each brace rod 110 is formed with a threaded section 110b which extends through an opening formed in a lug 110c that is fixed to the center angle of the centre weeder section. By tightening the nut on the threaded end of the rod 110, the latter is secured firmly to the lug 110c, thus effectively bracing the spindle of the associated gauge wheel. The construction of the gauge wheel at the other side of the center section is substantially identical and hence need not be described in detail.

It is to be noted that since the hinged weeder sections fold upwardly and over into a position above the rear ends of the main frame bars, the support of the weeder unit in transport is sturdy and rigid. The depth of operation of the weeder teeth is controlled by the hand lever 34 which raises or lowers the rear end of the main frame 10 by reacting against the tractor through the chain 55 which serves as suspension means extending between the arm 46 and the tractor carried arm 122.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim therefore, and desire to secure by Letters Patent is:

1. In a weeder, a plurality of weeder sections comprising a center section and two laterally outer sections, transverse hinges connecting the inner ends of the outer sections with the ends, respectively, of the center section, each outer section having a depending bracket and the adjacent end of the center section also having a depending bracket, said brackets extending below the adjacent hinge, a spring connected to the bracket on each outer section, and a yoke disposed about the associated hinge and connecting each spring with the adjacent bracket on the center section, said yoke serving to dispose the spring in a position below the associated hinge so that the spring tends to hold the associated section in its down or operating position, the bracket on each outer section being swingable with the latter to a position to carry the line of action of the spring above the associated spring so that when the outer section is in its upper transport position the spring serves to hold the outer section in its upper position.

2. The invention set forth in claim 1, further characterized by a stop member carried by each of the outer sections and engageable with said center section for determining the transport position of the outer sections.

3. An agricultural implement comprising a pair of sections, a transverse member pivotally connecting said sections, a biasing spring, and means connecting said biasing spring with said sections at points between the sides of the sections and spaced from the pivot axis defined by said transverse member, said connecting means including a yoke member spanning said transverse member from one side thereof and having ends disposed at the other side of said transverse member, one of said ends receiving the action of said biasing spring and the other being connected with one of said sections whereby the line of action of said spring may be disposed at one side of said pivot axis when said sections are extended and at the other side of said pivot axis when one section is disposed in a position on the other section.

4. A weeder comprising support means, tool means comprising a plurality of weeder sections including a center section and a pair of outer sections and hinge means pivotally connecting said sections together, means fixing the center section to said support means, spring means acting between said center section and each of the outer sections and connections between each of said spring means and the associated center and outer sections at points on said sections which lie on opposite sides of said hinge axes, respectively, and in lines passing below the hinge axes when the outer sections are lowered and which, when the outer sections are raised, lie in lines passing above the hinge axes, whereby the outer sections are urged toward a working position when the outer sections are in operating position and toward a transport position when said outer sections are swung upwardly about their hinged connections with the center section.

5. In a weeder, a plurality of weeder sections comprising a center section and two laterally outer sections, means hingedly connecting the outer sections with the ends, respectively, of the center section for movement relative thereto, each about an axis, a pair of springs, one connected at its inner end to each end portion of the center section and at its outer end to the associated outer section, and means comprising brackets establishing said connections and said brackets extending downwardly so that, when the outer section is in outwardly extending position, the line of action of said spring passes below said axis and when the outer section is in an upper folded position said line passes above said axis.

6. In a cultivator or the like, a plurality of sections comprising a center section and two laterally outer sections, means hingedly connecting the outer sections with the ends, respectively, of the center section, each of said outer sections including a pair of transversely extending frame members spaced apart in a fore and aft direction, said hinged connecting means comprising a yoke fixed to the upper sides of said frame members of each of said outer sections and having ends extending inwardly beyond the inner ends of the associated outer section in overlapping relation with and disposed at the upper side of the associated laterally outer portion of the center section when the sections are extended whereby the outer section, when extended, may be disposed in alignment with said center section, and means pivotally connecting the ends of said yoke to the adjacent portions of the center section inwardly of the ends.

7. The invention set forth in claim 6 further characterized by the inner ends of each of said yokes being apertured, and said pivotal connecting means for each yoke comprising a pair of brackets fixed to the associated outer end portion of the center section on the upper side thereof, and means pivotally connecting the inner ends of said yoke to said brackets.

8. The invention set forth in claim 6, further characterized by the inner ends of each of said yokes being apertured, and said pivotal connecting means for each yoke comprising a hinge rod extending through said apertured yoke ends and brackets receiving the ends of said hinge rod and fixed to the upper side of said center section.

9. The invention set forth in claim 6, further characterized by the inner ends of each of said yokes being apertured, and said pivotal connecting means for each yoke comprising a hinge rod extending through said apertured yoke ends and brackets receiving the ends of said hinge rod and fixed to the upper side of said center section each outer section having a depending bracket and the adjacent end of the center section also having a depending bracket, said brackets extending below the adjacent hinge rod, and biasing means connecting each pair of inner and outer brackets and including a yoke spanning the associated hinge rod whereby a line connecting the inner and outer brackets passes below the hinge rod when the sections are extended and above the hinge rod when the sections are folded.

WILLIAM A. HYLAND.
ERNST E. SCHNELL.

REFERENCES CITED

The following references are of record in the file of this patent:

UNITED STATES PATENTS

| Number | Name | Date |
|---|---|---|
| 399,628 | Pearce | Mar. 12, 1889 |
| 499,415 | Cardinal | June 13, 1893 |
| 829,766 | Chase | Aug. 28, 1906 |
| 958,567 | Ulrich | May 17, 1910 |
| 1,034,753 | Adix | Aug. 6, 1912 |
| 1,404,544 | Rettig | Jan. 24, 1922 |
| 1,531,975 | Reynolds | Mar. 31, 1925 |
| 2,221,769 | Hipple | Nov. 19, 1940 |
| 2,266,819 | Seaholm | Dec. 23, 1941 |
| 2,298,161 | Robinson | Oct. 6, 1942 |
| 2,302,842 | Cook | Nov. 24, 1942 |

FOREIGN PATENTS

| Number | Country | Date |
|---|---|---|
| 439,787 | Germany | Jan. 15, 1927 |